US005552973A

United States Patent [19]

Hsu

[11] Patent Number: 5,552,973

[45] Date of Patent: Sep. 3, 1996

[54] FLASHLIGHT WITH SELF-PROVIDED POWER SUPPLY MEANS

[76] Inventor: Chih-Hsien Hsu, Fl. 6, No. 7, Chi-Mei St., San-Chung City, Taipei County, Taiwan

[21] Appl. No.: 584,953

[22] Filed: Jan. 16, 1996

[51] Int. Cl.$^{6}$ .............................................. B60Q 1/00

[52] U.S. Cl. .............................. 362/192; 362/183; 320/2; 320/61

[58] Field of Search .................................. 362/192, 193, 362/183, 205, 208, 157; 320/2, 7, 61; 322/38, 30

[56] References Cited

U.S. PATENT DOCUMENTS 2,232,605 2/1941 Holmes .................................. 362/192
2,490,309 12/1949 Lehman .................................. 362/192
2,535,041 12/1950 Clark .................................. 362/192
4,360,860 11/1982 Johnson et al. .......................... 362/192
4,701,835 10/1987 Campagnuolo et al. .............. 362/192

*Primary Examiner*—James C. Yeung
*Attorney, Agent, or Firm*—Morton J. Rosenberg; David I. Klein

[57] ABSTRACT

A flashlight, which includes a traction-driven power generating device and a battery connected in parallel to the lamp through a switch, wherein the traction-driven power generating device includes a driving wheel turned by a traction cable, a spiral spring, which turns the driving wheel reversely to take up the traction cable after each traction, an one-way rotary member meshed with the driving wheel, an induction coil, and a flywheel coupled to the one-way rotary member by a clutch means and driven by the one-way rotary member to turn a magnet relative to the induction coil, causing the induction coil to produce electricity.

1 Claim, 4 Drawing Sheets

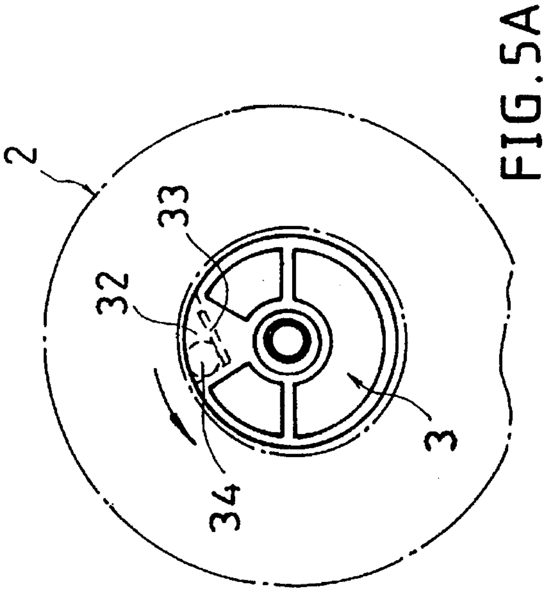
FIG.5A
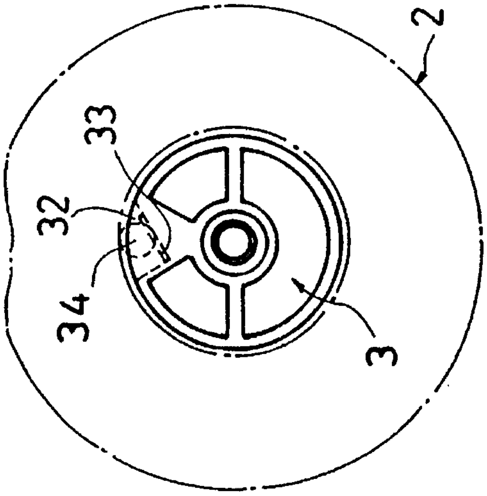
FIG.5
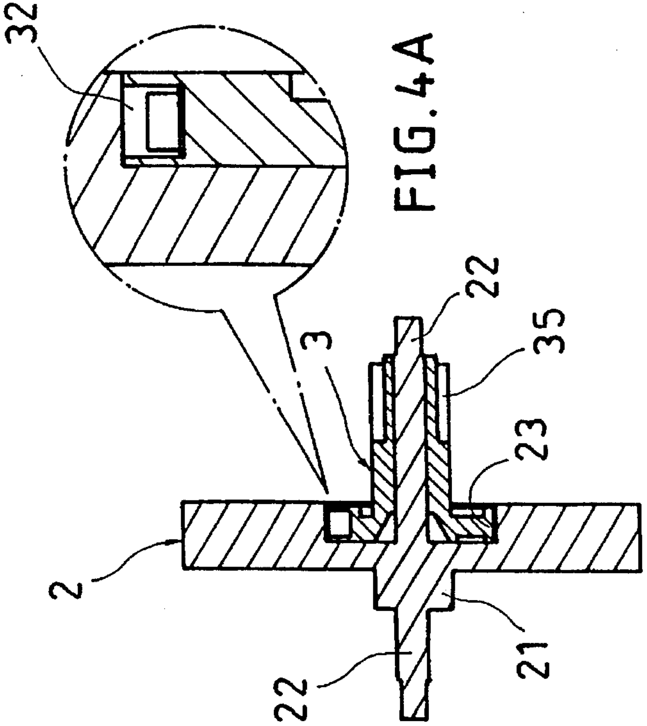
FIG.4A
FIG.4

FLASHLIGHT WITH SELF-PROVIDED POWER SUPPLY MEANS

BACKGROUND OF THE INVENTION

The present invention relates to a flashlight, and relates more particularly to such a flashlight which has self-provided power supply means.

Regular flashlights commonly use battery to provide the necessary working voltage. However, the continuous working time of a battery is short. If the battery power supply runs short, the flashlight becomes unworkable. Furthermore, waste battery will cause environmental pollutions if they are not properly disposed of.

SUMMARY OF THE INVENTION

The present invention has been accomplished under the circumstances in view. It is the principal object of the present invention to provide a flashlight which has self-provided power supply means to provide the necessary working voltage. According to one aspect of the present invention, the flashlight comprises a traction-driven power generating device driven to generate electricity. The traction-driven power generating device comprises a driving wheel turned by a traction cable, a spiral spring, which turns the driving wheel reversely to take up the traction cable after each traction, an one-way rotary member meshed with the driving wheel, an induction coil, and a flywheel coupled to the one-way rotary member by a clutch means and driven by the one-way rotary member to turn a magnet relative to the induction coil, causing the induction coil to produce electricity. According to another aspect of the present invention, a battery is provided and connected to the lamp through a switch in a parallel relation relative to the induction coil. By means of the control of the switch, electric power supply can be provided to the lamp from the battery or the induction coil.

BRIEF DESCRIPTION OF THE DRAWINGS

FIG. 4 is a sectional view in an enlarged scale showing the one-way rotary member coupled to the flywheel according to the present invention;

FIG. 4A is an enlarged view of a part of FIG. 4, showing the position of the rotary pin relative to the flywheel;

FIG. 5 shows the rotary pin forced into engagement with the flywheel according to the present invention; and FIG. 5A shows the flywheel rotated, and the rotary pin released from the flywheel according to the present invention.

DETAILED DESCRIPTION OF THE PREFERRED EMBODIMENT

Figure 1:
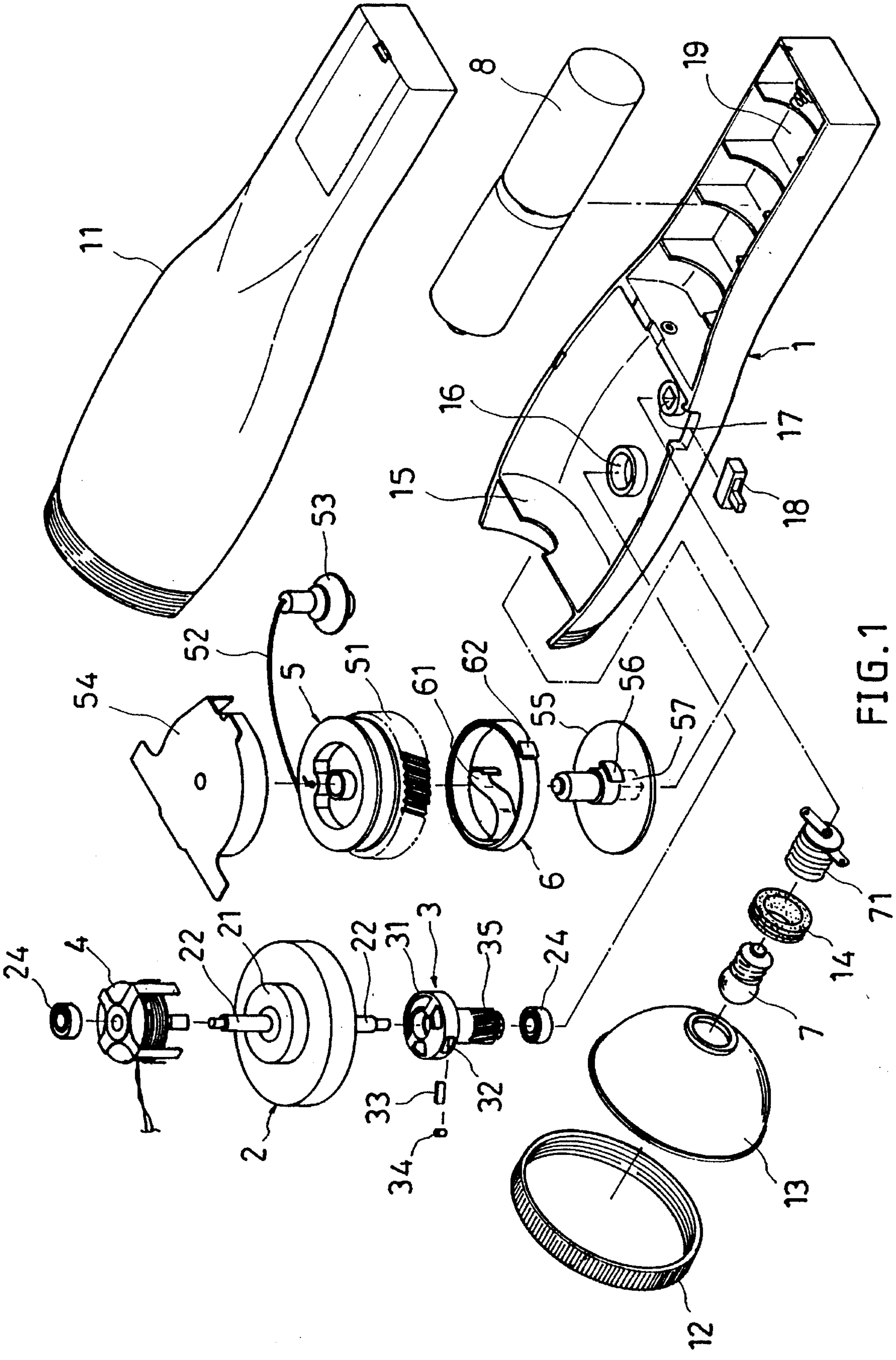
FIG. 1 is an exploded view of flashlight according to the present invention.
Figure 2:
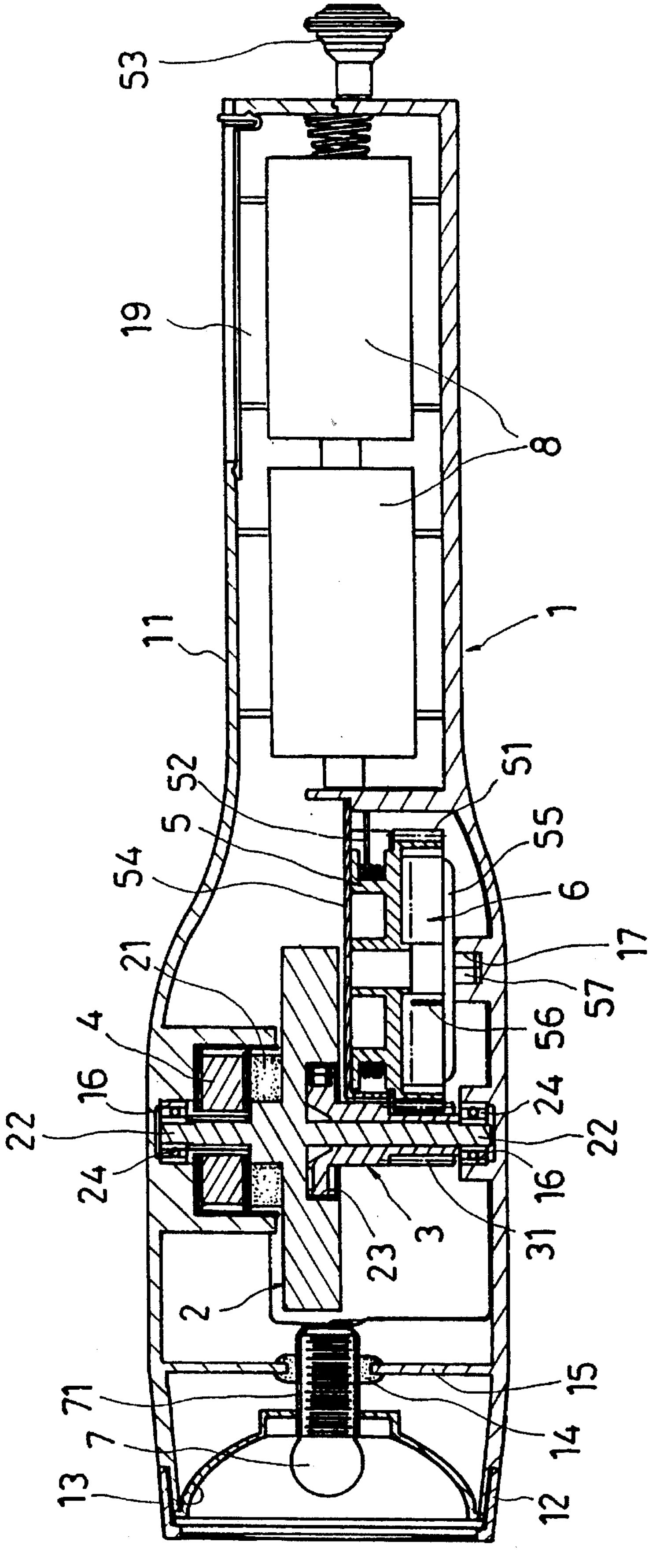
FIG. 2 is a side view in section of the flashlight shown in FIG. 1.
Figure 3:
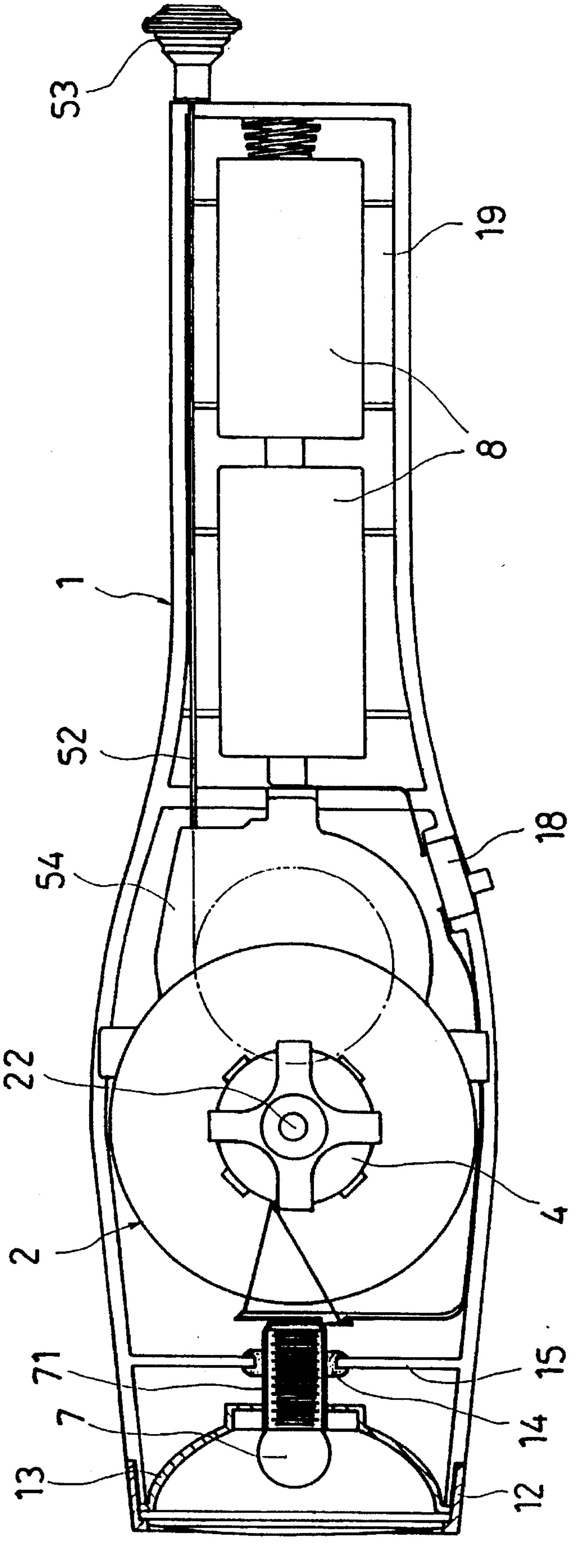
FIG. 3 is top view in section of the flashlight shown in FIG. 1.

Referring to FIGS. 1, 2, and 3, a flashlight in accordance with the present invention is generally comprised of a housing consisting of a bottom shell 1 and a cover shell 11, a flywheel 2, an one-way rotary member 3, an induction coil 4, a hollow driving wheel 5, a spiral spring 6, a lamp bulb 7, a lamp holder 71, and a battery 8. The housing 1 and 11 comprises a locating board 15 on the inside near the front end to hold a locating member 14, which holds the lamp holder 71, a battery chamber 19 on the inside near the rear end to hold the battery 8, two axle housings 16 respectively made on the bottom shell 1 and the cover shell 11, and a square stub tube 17 inside the bottom shell 1. The lamp bulb 7 is fastened to the lamp holder 71 and covered by a reflector 13, which is secured to the front end of the housing 1 and 11 by a cap 12. The driving wheel 5 is revolvably mounted a hub 55, covered by a cap 54, and wound round with a traction cable 52, which has one end extending out of the housing 1 and 11 and coupled with a handle 53. The hub 55 has a square bottom rod 57 fitted into the square stub tube 17, and a hook 56 at a suitable location. The driving wheel 5 has a toothed portion 51 around the periphery. When the traction cable 52 is pulled outwards, the driving wheel 5 is rotated on the hub 55. The spiral spring 6 is mounted within the hollow bottom side of the driving wheel 5, having one end 61 fastened to the hook 56 of the hub 55, and an opposite end 62 fastened to the inside of the driving wheel 5. The flywheel 2 has a wheel axle 22 revolvably supported in two opposite axle bearings 24 in the axle housings 16, and a magnet 21 fixedly mounted around the wheel axle 22. The one-way rotary member 3 comprises a base 31 mounted around the wheel axle 22 of the flywheel 2 at the bottom side, a toothed portion 35 meshed with the toothed portion 51 of the driving wheel 5. The base 31 of the one-way rotary member 3 has a sloping recess 32 at one side, which holds a metal plate 33 and a rotary pin 34 (see also FIGS. 4, 4A, and 5. When the one-way rotary member 3 is rotated, the rotary pin 34 extends out of the sloping recess 32 and touches the circular bottom recess 23 of the flywheel 2, causing flywheel 3 to be rotated by the one-way rotary member 3 (see FIG. 5). The induction coil 4 is fixedly mounted inside the housing 1 and 11 around the magnet 21 of the flywheel 2. The battery 8 and the induction coil 4 are connected in parallel to the lamp bulb 7 through a switch 18.

When the traction rope 52 is pulled to turn the driving wheel 5, the one-way rotary member 3 is driven by driving wheel 5 to turn the flywheel 2 and the magnet 21 relative to the induction coil 4, causing the induction coil, 4 to produce electric current. Electric current from the induction coil 4 is then transmitted to the lamp bulb 7 by means of the control of the switch 18. After each traction, the spiral spring 6 automatically pulls the driving wheel 5 in the reversed direction to take up the traction cable 52. When the one-way rotary member 3 is rotated in the reversed direction by the driving wheel 5, the rotary pin 33 moves away from the flywheel 2 back to the inside of the sloping recess 32 (see FIG. 5A). Therefore, the reverse rotation of the one-way rotary member 3 does not affect the forward rotation of the flywheel 2.

It is to be understood that the drawings are designed for purposes of illustration only, and are not intended as a definition of the limits and scope of the invention disclosed.

What is claimed is:

1. A flashlight comprising:

a housing having a hub on the inside;

a flywheel having a wheel axle turned between two axle bearings inside said housing, a magnet fixedly mounted around said wheel axle, and a circular bottom recess;

an one-way rotary member mounted around the wheel axle of said flywheel at a bottom side, said one-way rotary member comprising a base disposed in the circular recess of said flywheel, and a toothed portion around the periphery, the base of said one-way rotary member comprising a sloping recess at one side, a metal plate mounted within said sloping recess, and a rotary pin moved on said metal plate in said sloping recess between the operative position in which said rotary pin is forced by centrifugal force into engagement with the periphery of the circular recess of said flywheel upon the rotary motion of said one-way rotary member in one direction, and the non-operative position in which said rotary pin is forced away from the periphery of the circular recess of said flywheel upon the rotary motion of said one-way member in the reversed direction;

an induction coil fixedly mounted inside said housing around the magnet of said flywheel;

a driving wheel turned on said hub, said driving wheel having a toothed portion around the periphery meshed with the toothed portion of said one-way rotary member, and a bottom recess;

a spiral spring mounted around said hub within the bottom recess of said driving wheel, having one end fixedly secured to said hub and an opposite end fixedly secured to said driving wheel;

a traction cable having one end fastened to said driving wheel, and an opposite end wound round said driving wheel and coupled with a handle outside said housing;

a switch;

a lamp mounted in said housing at one end and connected to said induction coil through said switch; and a battery mounted in said housing at an opposite end and connected to said induction coil through said switch in parallel to said induction coil;

wherein when said traction rope is pulled to turn said driving wheel, said one-way rotary member is driven by said driving wheel to turn said flywheel, causing said induction coil induced by said magnet to produce electricity; after each traction, said spiral spring pulls said driving wheel to take up said traction cable.

* * * * *